(No Model.)
E. GRANT.
MACHINE FOR MAKING CORES.
No. 513,998. Patented Feb. 6, 1894.
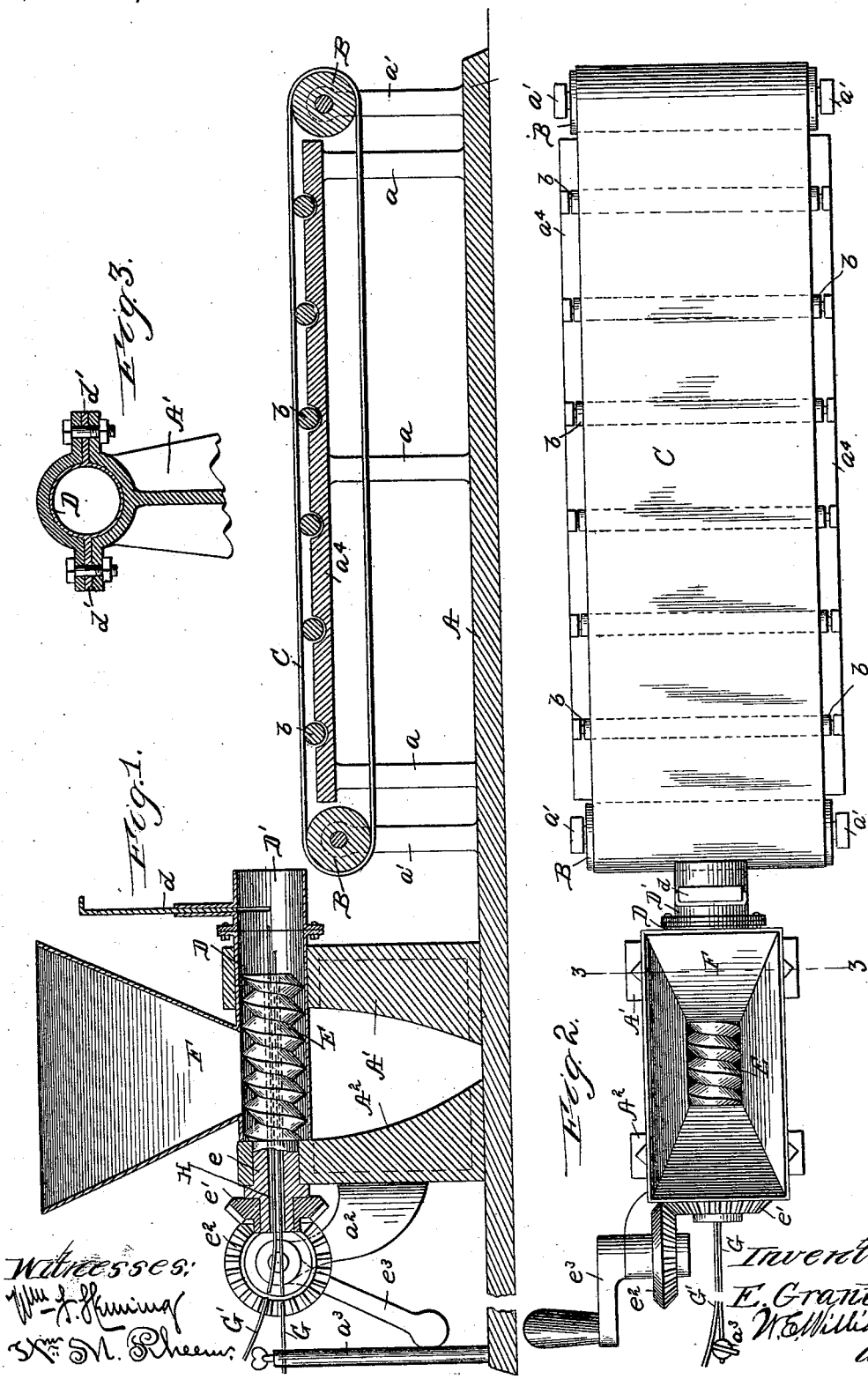

UNITED STATES PATENT OFFICE

EDWARD GRANT, OF KANKAKEE, ILLINOIS.

MACHINE FOR MAKING CORES.

SPECIFICATION forming part of Letters Patent No. 513,998, dated February 6, 1894.

Application filed January 18, 1893. Serial No. 458,758. (No model.)

*To all whom it may concern:*

Be it known that I, EDWARD GRANT, a citizen of the United States, residing at Kankakee, in the county of Kankakee, State of Illinois, have invented a new and useful Improvement in Machines for Making Cores for Founders' Use, of which the following is a specification.

My invention relates to a machine wherein the sand or the material for the core, after being properly mixed, is placed in a hopper, and the core is formed by the mechanism of the machine, complete ready for use; and the objects of my invention are to make simple, cheap and effective machines for making cores, which will have great capacity and will automatically place in a core the wire for stiffening the core, and will also perforate the center of the core for the escape of the gas in molding, and the invention consists in the elements and combinations set forth in the claims hereof.

Reference will be had to the accompanying drawings, in which Figure 1 is a side sectional view through the machine. Fig. 2 is a plan thereof; and Fig. 3 is a detail sectional view on the line 3—3.

Let A be the bed plate of the machine, to which are fastened the posts $a$, which support the frame $a^4$ carrying the rollers $b\ b$.

$a'$ designates the posts which support the rollers B carrying the carrier belt C.

A', $A^2$ designate the posts supporting the core forming mechanism, which mechanism consists in a hopper F. in which the material for the core is placed, and a core tube D, and an ejecting worm E. The worm E. is supported in the bearing $e$, and driven by the gear $e'$ meshing into the gear $e^2$ driven by the crank $e^3$, the bearing of which is supported by the bracket $a^2$. Instead of the crank, power mechanism may be here applied. The core tube D is supported in a bearing in the post A' in the manner shown by Fig. 3, wherein lugs on the sides of the tube D project out and are bolted into the bearing on the post A'. The worm E. has a circular aperture H through its center, through which there extends a wire G., which wire G. is fixed to the post $a^3$. That portion of the tube marked as D' is provided with a gate-way and a gate $d$., the object of which is to cut off the cores the proper length as they are ejected upon the carrier belt C. When cores of different sizes are desired to be made, the portion D' of the core tube is substituted for one of a different size. As the core is ejected by the worm E. onto the belt C. the operator enters a wire G' into the aperture H. of the worm E. and pushes it out until it is carried by the friction of the core material along with the core, and thereby becomes a part of it. The wire G. extends beyond the limit of the worm E. sufficient to make a fixed hole in the core as it is forced out of the core tube D. The friction of the material passing out of the tube D. causes the core to be compact on its outer edges and inclined to be porous on the interior, which is a desideratum. The friction of the cores on the belt C. as they are ejected from the tube D. by the worm E. drives the belt C. and they are removed from the belt C. by the operator.

What I claim is—

1. A machine for making cores substantially as described, consisting of a hopper for the core material, a worm for ejecting the material into and out of a tube, thereby forming the core, a belt or a table for receiving the same in combination with mechanism for forcing a wire into the body of the core as the same is formed and mechanism for making a hole in the body of the core for the escape of the gas, substantially as described.

2. A machine for making cores substantially as described consisting of mechanism for forcing the material for forming the cores out through a tube, thereby forming the core, and mechanism for making a hole in the body thereof for the escape of the gas substantially as described, in combination with mechanism for ejecting a wire into the body of the core to stiffen the same, substantially as shown and described.

3. A core making machine consisting of a hopper F located adjacent to, and supplying material to a tube D having within it a worm E for forcing material out through tube D, an aperture "H" within said worm, and a wire "A" held in a fixed position, passing through said aperture H, and terminating beyond the end of said worm H, for the purpose of forming a hole in the body of the core for the escape of the gas.

4. A core-making machine having mechanism for forcing material through a tube, thereby forming the core and mechanism for forming a hole in the body of the core for the escape of gas substantially as shown, said tube provided with a gateway and cutting off gate "d," which gate cuts the core, while the same is sustained in the end of the tube substantially as shown.

In witness whereof I have hereunto subscribed my name in the presence of two witnesses.

EDWARD GRANT.

Witnesses:
W. R. BRECKENRIDGE,
D. L. DURHAM.